(12) United States Patent
Thelakkadan et al.

(10) Patent No.: US 11,260,618 B2
(45) Date of Patent: Mar. 1, 2022

(54) USE OF POLYCARBONATE FOR THE MANUFACTURE OF HOLLOW CONTAINERS

(71) Applicant: SABIC GLOBAL TECHNOLOGIES B.V., Bergen op Zoom (NL)

(72) Inventors: Abdul Salam Thelakkadan, Geleen (NL); Rajendra Kashinath Singh, Geleen (NL); Ponniah Thavamani, Geleen (NL); Tariq Syed, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 276 days.

(21) Appl. No.: 16/611,270

(22) PCT Filed: May 8, 2018

(86) PCT No.: PCT/EP2018/061808
§ 371 (c)(1),
(2) Date: Nov. 6, 2019

(87) PCT Pub. No.: WO2018/210620
PCT Pub. Date: Nov. 22, 2018

(65) Prior Publication Data
US 2020/0164565 A1    May 28, 2020

(30) Foreign Application Priority Data
May 17, 2017  (EP) .................................. 17171557

(51) Int. Cl.
| B32B 1/02 | (2006.01) |
| B29C 49/04 | (2006.01) |
| B29C 49/06 | (2006.01) |
| B65D 1/02 | (2006.01) |
| C08G 64/04 | (2006.01) |
| C08G 64/30 | (2006.01) |
| B29K 69/00 | (2006.01) |
| B29L 31/00 | (2006.01) |

(52) U.S. Cl.
CPC ............... B32B 1/02 (2013.01); B29C 49/04 (2013.01); B29C 49/06 (2013.01); B65D 1/0207 (2013.01); B65D 1/0215 (2013.01); C08G 64/04 (2013.01); C08G 64/307 (2013.01); B29K 2069/00 (2013.01); B29L 2031/7158 (2013.01)

(58) Field of Classification Search
CPC ....... B32B 1/02; B32B 27/365; B65D 1/0207; B65D 1/0215; C08G 64/04; C08G 64/045; C08G 64/06; C08G 64/30; C08G 64/302; C08G 64/305; C08G 64/307; B29C 49/0005; B29C 49/04; B29C 49/06; B29K 2069/00; B29L 2031/7158
See application file for complete search history.

(56) References Cited

U.S. PATENT DOCUMENTS 6,504,002 B1    7/2003   Karlik et al.

FOREIGN PATENT DOCUMENTS

| EP | 2174970 A1 | 4/2010 |
| EP | 2592102 A1 | 5/2013 |
| EP | 2248841 B9 | 9/2013 |
| EP | 2552995 B1 | 12/2015 |
| WO | 2011116971 A1 | 9/2011 |
| WO | 2011120921 A1 | 10/2011 |

OTHER PUBLICATIONS

In Hak Baick et al. "UltraHigh Molecular Weight Nonlinear Polycarbonates Synthesized in Microlayers", Industrial & Engineering Chemistry Research, vol. 52, No. 49, Dec. 11, 2013, p. 17419-17431.
International Search Report; International Application No. PCT/EP2018/061808; International Filing Date: May 8, 2018; dated Jun. 15, 2018; 4 pages.
Wang et al. "Adsorption of Bisphenol A Onto Cationic Modified Zeolite" Proceedings of the 14th International Conference on Environmental Science and Technology, Athens, Greece, Sep. 3-5, 2015.
Written Opinion; International Application No. PCT/EP2018/061808; International Filing Date: May 8, 2018; dated Jun. 15, 2018; 4 pages.

*Primary Examiner* — Walter Aughenbaugh
(74) *Attorney, Agent, or Firm* — Cantor Colburn LLP

(57) ABSTRACT

The present invention relates to the use of an aromatic polycarbonate prepared by the transesterification of a bisphenol and a diaryl carbonate and having a viscosity average molecular weight, Mv, of from 22000 to 32000 g/mol, a polydispersity, defined as Mw/Mn, of from 1.8-3.2, a melt-flow index of from 3.0-10 g/10 min as determined in accordance with ASTM D 1238 (1.2 kg, 300° C.), an amount of Fries branching of from 750 to 2500 ppm, for the manufacture of bottles having a volume of at least 15 liter by means of an injection blow moulding or an extrusion blow moulding process.

12 Claims, No Drawings

USE OF POLYCARBONATE FOR THE MANUFACTURE OF HOLLOW CONTAINERS

CROSS REFERENCE TO RELATED APPLICATIONS

This application is a 371 of International Application No. PCT/EP2018/061808, filed May 8, 2018, which is incorporated by reference in its entirety, and which claims priority to European Application Serial No. 17171557.6, filed May 17, 2017.

The present invention relates to the use of an aromatic polycarbonate for the manufacture of relatively large volume hollow containers, in particular bottles.

The present invention further relates to a relatively large volume bottle prepared by injection blow moulding or extrusion blow moulding a polycarbonate.

The present invention further relates to method for preparing a relatively large volume bottle comprising injection blow moulding or extrusion blow moulding a polycarbonate prepared by the transesterification of a bisphenol and a diaryl carbonate.

Processes for the manufacture of hollow containers, in particular bottles, from polycarbonate are well known and are generally referred to as injection blow moulding and extrusion blow moulding. In these processes molten polycarbonate is blown from a certain preform into its final shape. A variation of injection blow moulding is the injection stretch blow moulding where the preform in not only blown but also, simultaneously, stretched in order to obtain its final shape. In the context of the present invention the term injection stretch blow moulding is encompassed by the more general term injection blow moulding. It will be readily apparent that the expansion of the preform involves a reduction in the wall thickness of the preform and in order to be able to successfully produce large size bottles branched polycarbonate is commonly used.

Branched polycarbonate may be prepared via the interfacial process for making polycarbonate involving a reaction of phosgene and bisphenol A in the presence of a chain branching agent, i.e. a further reactant that has at least three functional groups and induces branching or even crosslinking of the polycarbonate.

Polycarbonate prepared via the melt process, wherein a bisphenol such as bisphenol A and a diaryl carbonate, such as diphenyl carbonate are reacted in the presence of a transesterification catalyst generally results in a more linear polycarbonate molecule which was found to exhibit an insufficient melt strength in order to be suitable for the injection blow moulding or extrusion blow moulding into large volume bottles.

EP 2248841 discloses that polycarbonate manufactured via the transesterification process, i.e. the melt process, may nonetheless be successfully used for the manufacture of bottles provided the polycarbonate has a relatively high degree of Fries branching. Fries branching is a type of branching that is introduced in polycarbonates prepared using the melt transesterification process even without the presence of chain branching agents. The amount of such fries branching depends inter alia on the type and amount of catalyst that is used. The high degree of Fries branching results in high melt strength which allows the manufacture of high volume containers using blow moulding techniques.

U.S. Pat. No. 6,504,002 discloses a method for the production of a branched polycarbonate composition, having increased melt strength, by late addition of branch-inducing catalyst to the polycarbonate oligomer in a melt polycondensation process. The branched polycarbonate composition may be used in blow molding processes like extrusion blow molding or injection stretch blow molding for the manufacture of hollow products such as bottles.

EP 2552995 discloses a polycarbonate obtained by transesterification of at least one aromatic diphenol with diphenyl carbonate in the melt transesterification process, having a weight average molecular weight Mw of at least 18000 g/mol and an OH terminal group content of less than 150 mg/kg, and contents of Fries branching species of at least 5 mg/kg and at most 2500 mg/kg.

EP 2174970 discloses an aromatic polycarbonate resin which is obtainable from an ester exchange reaction of an aromatic dihydroxy compound and a carbonic acid diester, and satisfies such the following conditions (1) to (3) that:
(1) viscosity-average molecular weight is 13,000 to 30,000;
(2) the amount of the residual aromatic monohydroxy compound and the amount of the residual aromatic dihydroxy compound in the resin are each not more than 20 ppm; and (3) the resin contains at least one of the structural units of the following formulae (1) to (5), with the total amount of such structural units being 1,000 to 6,000 ppm:

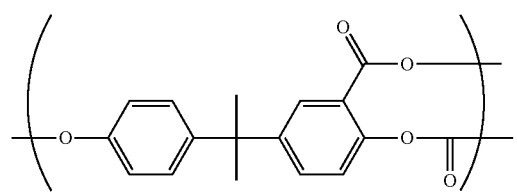

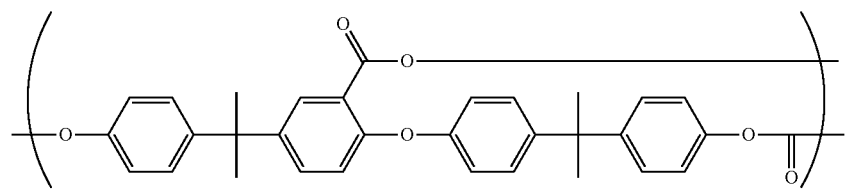

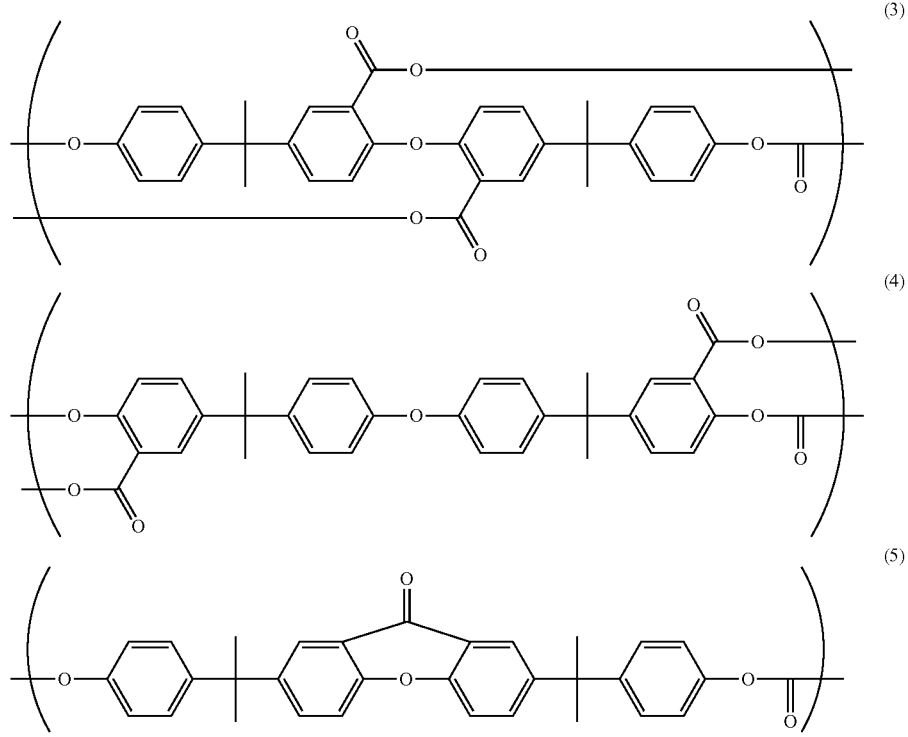

The polycarbonate resins according to this patent application find useful application to the construction materials such as sheeting, containers such as water bottle, head lamp lens for automobiles, optical lens for glasses, optical recording materials such as optical disc, photoconductive plates such as liquid crystal display, and such.

EP 2592102 discloses branched PC for water bottles.

WO 2011/116971 discloses a branched carbonate polymer composition comprising a blend of a branched carbonate polymer component, a first linear carbonate polymer component, and a second linear carbonate polymer component, wherein the ratio of melt flow rates of the first linear carbonate polymer component to the second linear carbonate polymer component is equal to or greater than 1 to 3. WO 2011/116971 further discloses containers comprising the improved branched carbonate polymer composition, and methods to manufacture said containers.

A problem with larger hollow containers, such as bottles having an internal volume of at least 15 liter, is that a high melt strength is required. Such melt strength may be obtained either by using a branching agent during the process to manufacture the polycarbonate in the interfacial or melt process, or by an increased level of Fries branching, which may be induced during the melt polycondensation process under the application of a suitable catalyst.

The present inventors have found that a high Fries branching content is less favourable to optical properties, in particular optical stability, of the polycarbonate. In addition a higher Fries branching may result in less favourable impact properties of the polycarbonate. Surprisingly the present inventors have now found that certain polycarbonates, with relatively low amount of Fries branching may be used for the manufacture of large bottles.

Accordingly the present invention is directed at the use of an aromatic polycarbonate prepared by the transesterification of a bisphenol and a diaryl carbonate and having:

a viscosity average molecular weight, Mv, of from 22000 to 32000 g/mol a polydispersity, defined as Mw/Mn, of from 1.8-3.2, preferably from 2.0-3.0 a melt-flow index of from 3.0-10 g/10 min as determined in accordance with ASTM D 1238 (1.2 kg, 300° C.)

an amount of Fries branching of from 750 to 2500 ppm for the manufacture of bottles having a volume of at least 15 liter by means of an injection (stretch) blow moulding or an extrusion blow moulding process.

The present invention also relates to a method for the manufacture of a bottle having a volume of at least 15 liter comprising the steps of melt transesterification of a bisphenol and a diaryl carbonate to form a polycarbonate having a viscosity average molecular weight, Mv, of from 22000 to 32000 g/mol, a polydispersity, defined as Mw/Mn, of from 1.8-3.2 and a melt-flow index of from 3.0-10 g/10 min as determined in accordance with ASTM D 1238 (1.2 kg, 300° C.)

optionally adding stabilisers and/or a dye to said polycarbonate injection blow moulding or extrusion blow moulding said polycarbonate to form said bottle.

The present invention further relates to a bottle having a volume of at least 15 liter, and obtained via injection blow moulding or extrusion blow moulding a polycarbonate prepared by the transesterification of a bisphenol and a diaryl carbonate, said polycarbonate having:

a viscosity average molecular weight, Mv, of from 22000 to 32000 g/mol a polydispersity, defined as Mw/Mn, of from 1.8-3.2, preferably from 2.0-3.0 a melt-flow index of from 3.0-10 g/10 min as determined in accordance with ASTM D 1238 (1.2 kg, 300° C.)

an amount of Fries branching of from 750 to 2500 ppm

The term "melt transesterification" in the context of the manufacture of polycarbonate is well known to the skilled person and refers to the direct reaction of bisphenol and a diaryl carbonate. Thus, the present invention does not relate to the interfacial process for making polycarbonate usually involving the reaction of phosgene and bisphenol A in a solvent. Melt transesterification processes are well known to a skilled person as are method for controlling the level of Fries which depend inter alia on the type and amount of catalyst, the temperature(s) used in the—usually multi-stage—process and the residence time.

The bisphenol is preferably bisphenol A (BPA) and the diaryl carbonate is preferably diphenyl carbonate (DPC).

The polycarbonate is a linear polycarbonate meaning that the melt transesterification was carried out on the basis of the bisphenol and diarylcarbonate in absence of any branching agent, such as for example multi-functional alcohols. Notwithstanding the foregoing it is well known that the melt transesterification process for the manufacture of polycarbonate, wherein bisphenol a and diphenyl carbonate are reacted in molten conditions thereby releasing phenol, results in a certain amount of branching, known as Fries branching. The amount of Fries branching depends inter alia on the type and amount of transesterification catalyst that is used as well as the reaction conditions that are applied, in particular the temperature, pressure and residence times. Thus a linear polycarbonate in the context of the present invention will contain a certain amount of Fries branching. It is however to be understood that the polycarbonate in the present invention is preferably manufactured in absence of a branching agent, i.e. an agent that includes three or more functional groups and thereby introduces branching or cross-linking of the polycarbonate.

The amount of Fries branching is from 1000-2500, preferably from 1500-2500 ppm. The term Fries branching is known to the skilled person and refers inter alia to the structures as disclosed in EP2174970, yet may include further branched structures. Fries branching is typical to the melt process for the manufacture of polycarbonate and depends inter alia on the reaction conditions like temperature, pressure and residence time as well as the type and amount of catalyst that is used in said process. Fries levels above 2500 ppm may make the polycarbonate more brittle which is not desirable in view of the intended application. WO 2011/120921 discloses that units such as disclosed in EP 217940 are Fries branching species.

The viscosity average molecular weight is from 22000 to 32000 g/mol such as from 24000 to 30000 or 25000 to 27000 g/mol as determined using triple detection array GPC.

The weight average molecular weight may be from 25000 to 35000 g/mol such as from 27000 to 30000 g/mol as measured with GPC using polystyrene standards.

The number average molecular weight may be from 7500 to 12500 g/mol such as from 9000 to 11000 g/mol as measured with GPC using polystyrene standards.

The melt flow index is preferably from 4.0 to 8.0 g/10 min as determined in accordance with ASTM D 1238 (1.2 kg, 300° C.)

The hollow container as defined above is preferably a bottle, in particular a water bottle. Said bottle may have a volume of at least 15 liter, more preferably a volume of at least 18.92 liter (5 US gallon).

Measurement Methods

The total Fries branching content is determined by the hydrolysis of PC with methanolic KOH followed by acidifying to estimate the methylated Fries rearranged bisphenol in PC. The methyl ester of BPA in the sample is then determined by HPLC technique and quantified by external calibration method. The instrument used was an Agilent infinity system. Determination of Fries branching is known to the skilled person in the field of polycarbonate.

The molecular weights Mw, Mn and My were measured using TDA GPC (Triple detection Array gel permeation chromatography) technique and the measurements were performed using a Viscotek TDA 305 triple detection system. The molecular weight is measured as absolute molecular weight.

The melt-flow index was measured in accordance with ASTM D 1238 (1.2 kg, 300° C.).

Quality of the bottles was determined using visual inspection and by performing a drop test wherein a bottle filled with water (5 US gallon) is dropped 3 times on a concrete surface from a height of approximately 1.5 m. The quality of the bottle is considered sufficient if the bottle is not leaking any of the water contained therein.

In an embodiment the polycarbonate further includes from 20-200 ppm, preferably from 70-150 ppm by weight based on the weight of the polycarbonate of a zeolite suitable for the removal of larger odor molecules, such as aromatics. The present inventors found that at higher loadings of zeolite the polycarbonate becomes translucent, whereas at levels below 20 ppm the effect of the zeolite is low. A preferred example of a zeolite that shows good performance is ZEOflair® 810 commercially available from Zeochem. Other materials from the same company, ZEOflair® 100 and ZEOflair® 300 did not show the desired effect.

EXAMPLES

A polycarbonate was manufactured in accordance with the melt transesterification method using BPA and DPC as the starting materials.

A comparative example consists of a branched polycarbonate manufactured in accordance with the interfacial process. Such polycarbonate is known not have any Fries branching.

The polycarbonates used in the experiments had the following properties

TABLE 1

|  | Example | Comparative Example |
| --- | --- | --- |
| Fries branching | 1729 [ppm] | [—] |
| Mn | 10828 [g/mol] | 8513 [g/mol] |
| Mw | 26753 [g/mol] | 31724 [g/mol] |
| Mw/Mn | 2.47 [—] | 3.73 [—] |
| Mv | 24043 [g/mol] | 27101 [g/mol] |
| MI | 6.0 [g/10 min] | 2.6 [g/10 min] |

(Mn, Mw and Mv being determined using TDA-GPC)

The materials as specified in the Table 1 above were used in experiments to manufacture bottles by an extrusion blow molding process. The volume of the bottles was 5 US gallons (18.9 liter). The equipment comprised a single screw extruder an extrusion die and a mold operated at the settings indicated in Table 2 below.

TABLE 2

| Extruder Temp (° C.) | | | Die Temp (° C.) | | | Mold Temp (° C.) | |
|---|---|---|---|---|---|---|---|
| Zone | CE | EX | Zone | CE | EX | CE | EX |
| Cyl 1 | 248 | 240 | Die Head | 236 | 210 | 75 | 75 |
| Cyl 2 | 235 | 220 | | | | | |
| Cyl 3 | 242 | 213 | Die 1 | 220 | 201 | | |
| Cyl 4 | 242 | 213 | | | | | |
| Cyl 5 | 240 | 214 | Die 2 | 220 | 203 | | |
| Adaptor | 236 | 210 | | | | | |
| Neck | 228 | 210 | Die 3 | 236 | 205 | | |

Bottles without any visual defects could be produced from both comparative polycarbonate as the polycarbonate according to the invention. Both bottles also passed the drop test. The Table 2 shows that, compared to the Comparative Example, the polycarbonate as defined herein not only allows good quality bottles to be produced, but also a lower energy consumption as a result of the lower temperature settings of the extruder and die.

The materials as specified in the Table 1 above were also used in experiments to manufacture bottles by an injection stretch blow molding process (ISBM). The volume of the bottles was 5 US gallon (18.9 liter). The equipment used was a commercially available injection stretch blow molding machine comprising an extruder having five heating zones in the barrel, three hot zones in the hot runner and seven zones in the preheater (also referred to as hot pot). The hot pot is used to condition the preform prepared in the hot runner prior for said preform to be blown to its final bottle shape. Injection stretch blow molding equipment is known to a skilled person.

The settings in the ISBM process were as follows, wherein M/C refers to the molding conditions.

TABLE 3a

| ISBM settings for PC according to the invention (EX) | | | |
|---|---|---|---|
| Zones | M/C (° C.) | Hot Runner (° C.) | Hot Pot (° C.) |
| 1 | 260 | 290 | 173 |
| 2 | 260 | 285 | 142 |
| 3 | 270 | 335 | 140 |
| 4 | 260 | | 140 |
| 5 | 290 | | 148 |
| 6 | | | 166 |
| 7 | | | 240 |

TABLE 3b

| ISBM settings for PC according to the invention (EX) | | | |
|---|---|---|---|
| Zones | M/C (° C.) | Hot Runner (° C.) | Hot Pot (° C.) |
| 1 | 285 | 290 | 200 |
| 2 | 285 | 290 | 185 |
| 3 | 290 | 335 | 175 |
| 4 | 285 | | 160 |
| 5 | 290 | | 160 |
| 6 | | | 170 |
| 7 | | | 240 |

From comparing Tables 3a and 3b again it becomes clear that the polycarbonate according to the invention allows for less energy consumption while the experiments resulted in good quality bottles for both the experiment as the comparative experiment. Both bottles passed the drop test.

Zeolite Addition

Polycarbonates with and without zeolite were analysed on presence of volatiles using head space GCMS techniques performed at a temperature of 200° C. The zeolite was ZEOflair® 810 which was added in an amount of 100 ppm. The surface area's of the peaks relating to phenol, 2,4-di-tert-butylphenol and diphenyl-carbonate were determined. It was found that under the given test conditions the total surface area was reduced with 19% indicating that the zeolite captured the said molecules and prevented the same from being released from the material upon performance of the GCMS headspace test.

The invention claimed is:

1. A bottle, comprising:
   a volume of at least 15 liter, and obtained via injection blow moulding or extrusion blow moulding a polycarbonate prepared by the transesterification of a bisphenol and a diaryl carbonate, said polycarbonate having:
   a viscosity average molecular weight, $M_v$, of from 22000 to 32000 g/mol,
   a polydispersity, defined as $M_w/M_n$, of from 1.8-3.2,
   a melt-flow index of from 3.0-10 g/10 min as determined in accordance with ASTM D 1238 (1.2) kg, 300° C.), and
   an amount of Fries branching of from 750 to 2500 ppm.

2. The bottle of claim 1 having a volume of at least 18.9 liters (5 US gallon).

3. The bottle of claim 1 wherein the polycarbonate further contains from 20-200 ppm, by weight based on the weight of the polycarbonate of a zeolite suitable for the removal of aromatic molecules.

4. The bottle of claim 1, wherein the polydispersity is from 2.0-3.0.

5. The bottle of claim 4, wherein the polycarbonate further contains from 20-200 ppm, by weight based on the weight of the polycarbonate of a zeolite suitable for the removal of aromatic molecules.

6. The bottle of claim 5, wherein the polycarbonate contains from 70-150 ppm of the zeolite.

7. A method for the manufacture of a bottle having a volume of at least 15 liters, comprising:
   melt transesterification of a bisphenol and a diaryl carbonate to form a polycarbonate having a viscosity average molecular weight, $M_v$, of from 22000 to 32000 g/mol, a polydispersity, defined as $M_w/M_n$, of from 1.8-3.2 and a melt-flow index of from 3.0-10 g/10 min as determined in accordance with ASTM D 1238 (1.2) kg, 300° C.),
   optionally adding stabilisers and/or a dye to said polycarbonate, and
   injection blow moulding or extrusion blow moulding said polycarbonate to form said bottle.

8. The method of claim 7 wherein the bottle has a volume of at least 18.9 liters (5 US gallon).

9. The method of claim 7, further comprising adding from 20-200 ppm by weight based on the weight of the polycarbonate of a zeolite suitable for the removal of aromatic molecules prior to forming of the bottle.

10. The method of claim 9, comprising adding from 70-150 ppm of the zeolite prior to forming of the bottle.

11. The method of claim 7, comprising adding stabilisers and/or a dye to said polycarbonate, and wherein the polydispersity is from 2.0-3.0.

12. The method of claim 11, wherein the bottle has a volume of at least 18.9 liters (5 US gallon).

* * * * *